United States Patent
Yu et al.

(10) Patent No.: US 7,646,704 B2
(45) Date of Patent: Jan. 12, 2010

(54) METHOD AND APPARATUS FOR SPUR CANCELLATION IN AN ORTHOGONAL FREQUENCY DIVISION MULTIPLEXING COMMUNICATION SYSTEM

(75) Inventors: Xiaoyong Yu, Grayslake, IL (US);
Thomas J. Kovarik, Grayslake, IL (US);
Alan P. Rottinghaus, Barrington, IL (US)

(73) Assignee: Motorola, Inc., Schaumburg, IL (US)

( * ) Notice: Subject to any disclaimer, the term of this patent is extended or adjusted under 35 U.S.C. 154(b) by 437 days.

(21) Appl. No.: 11/554,788

(22) Filed: Oct. 31, 2006

(65) Prior Publication Data

US 2008/0101212 A1    May 1, 2008

(51) Int. Cl.
*H04J 11/00* (2006.01)
(52) U.S. Cl. ...................................... 370/208
(58) Field of Classification Search ................. 370/208, 370/210, 343; 455/130; 375/139
See application file for complete search history.

(56) References Cited

U.S. PATENT DOCUMENTS

| | | | | |
|---|---|---|---|---|
| 2004/0066773 A1* | 4/2004 | Sun et al. | ..................... | 370/343 |
| 2005/0059366 A1* | 3/2005 | Choi et al. | ................... | 455/130 |
| 2005/0152314 A1 | 7/2005 | Sun et al. | | |
| 2006/0087461 A1 | 4/2006 | Danzig et al. | | |
| 2006/0093019 A1* | 5/2006 | Gaikwad et al. | ............. | 375/139 |

FOREIGN PATENT DOCUMENTS

EP    1648093  A1    10/2006

* cited by examiner

*Primary Examiner*—Albert T Chou
(74) *Attorney, Agent, or Firm*—Steven A. May

(57) ABSTRACT

A communication device is provided that is capable of operating in an OFDM or communication system and that provides for cancellation of in-band spurs. The communication device identifies a bin of multiple bins associated with an output of an inverse transformer and comprising a spur and estimates one or more spur phase parameters and a spur amplitude in association with the identified bin. In one embodiment of the present invention, the one or more spur phase parameters includes a spur initial phase and a spur change rate. When the communication device receives a signal from another communication device, the communication device transforms the received signal to produce a multiple parallel output signals that are each associated with a bin of the multiple bins and cancels a spur in an output signal associated with the identified bin based on the estimated one or more spur phase parameters and spur amplitude.

39 Claims, 7 Drawing Sheets

200

Phase change rate and spur amplitude on adjacent subcarriers as function of delta (δ)

| delta | 0.00 | 0.01 | -0.01 | 0.05 | -0.05 | 0.10 | -0.10 | 0.30 | -0.30 | 0.50 | -0.50 |
|---|---|---|---|---|---|---|---|---|---|---|---|
| phase change rate in radians | 0.79 | 0.86 | 0.71 | 1.14 | 0.43 | 1.49 | 0.08 | 2.91 | -1.34 | -1.96 | -2.75 |
| A on m-1 | 0.00 | 0.10 | 0.10 | 0.47 | 0.53 | 0.89 | 1.09 | 1.98 | 3.68 | 2.12 | 6.37 |
| A on m | 10.00 | 10.00 | 10.00 | 9.96 | 9.96 | 9.84 | 9.84 | 8.58 | 8.58 | 6.37 | 6.37 |
| A on m+1 | 0.00 | 0.10 | 0.10 | 0.53 | 0.47 | 1.09 | 0.89 | 3.68 | 1.98 | 6.37 | 2.12 |

A centered 20 dB spur seen in FFT output

Enlarged centered 20 dB spur in FFT output

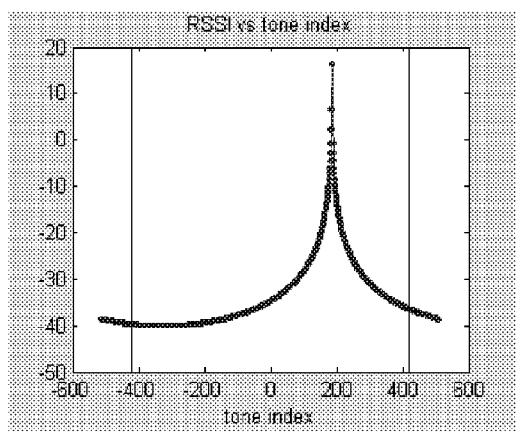
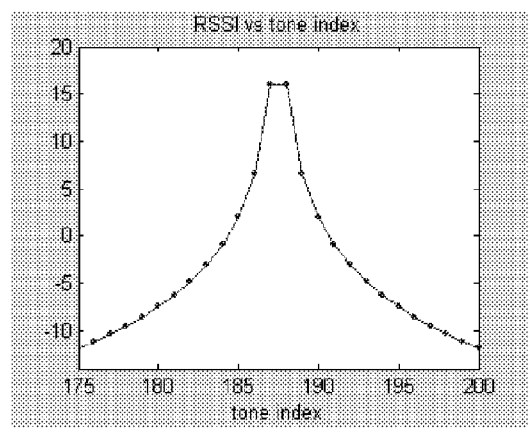
A 20 dB spur at edge of two subcarriers
Enlarged 20 dB spur at edge of two subcarriers
FIG. 9
FIG. 10

METHOD AND APPARATUS FOR SPUR CANCELLATION IN AN ORTHOGONAL FREQUENCY DIVISION MULTIPLEXING COMMUNICATION SYSTEM

FIELD OF THE INVENTION

The present invention relates generally to Orthogonal Frequency Division Multiplexing (OFDM) communication systems, and, in particular, to spur cancellation in an OFDM communication system.

BACKGROUND OF THE INVENTION

In an Orthogonal Frequency Division Multiplexing (OFDM) communication system, a frequency bandwidth is split into multiple contiguous frequency sub-bands, or sub-carriers, that are transmitted simultaneously. In an Orthogonal Frequency Division Multiple Access (OFDMA) communication system, a user may then be assigned one or more of the frequency sub-bands for an exchange of user information, thereby permitting multiple users to transmit simultaneously on the different sub-carriers. These sub-carriers are orthogonal to each other, and thus there is no inter-sub-carrier interference in theory This invention can be applied to both OFDM systems, where all sub-carriers are assigned to a single user, and OFDMA systems, where the sub-carriers are shared by multiple users in the same time. In what follows, the OFDM and OFDMA are interchangeable.

In an OFDMA receiver, mixers translate a high input radio frequency (RF) to a lower intermediate frequency (IF). This process is know as downconversion and it utilizes a difference term between the mixer's RF input and a local oscillator (LO) input for low side injection (LO frequency<RF frequency), or a difference term between the mixer's LO and RF inputs for high-side injection. This downconversion process can be described by the following equation, $$f_{IF} = \pm f_{RF} \pm f_{LO},$$

where $f_{IF}$ is the intermediate frequency (IF) at the mixer's output port, $f_{Rf}$ is any RF signal applied to the mixer's RF input port, and $f_{LO}$ is the local oscillator signal applied to the mixer's LO input port.

Ideally, an amplitude and a phase of the mixer output signal are proportional to the RF input signal's amplitude and phase and are independent of the LO signal characteristics. However, in practice, mixer nonlinearities produce undesired mixing products, called spurious responses, or spurs, which are caused by undesired signals reaching the mixer's RF input port and producing a response at the IF frequency. The signals reaching the RF input port do not necessarily have to fall into the desired RF band to be troublesome. Many of these signals are sufficiently high in power level that the RF filters preceding the mixer don't provide enough sensitivity to keep them from causing additional spurious responses. When they interfere with the desired IF frequency, the mixing mechanism can be described by the following equation, $$f_{IF} = \pm m f_{RF} \pm n f_{LO},$$

where m and n are integer harmonics of both the RF and LO frequencies that mix to create numerous combinations of spurious products.

In reality, the amplitude of these spurious components decreases as the value of m or n increases. By knowing the desired RF frequency range, frequency planning may be used to carefully select the IF and the corresponding LO frequencies to avoid spurious mixing products whenever possible. Filters are then used to reject out-of-band RF signals that might cause in-band IF responses. Intermediate frequency (IF) filter sensitivity following the mixer is then specified to pass only the desired frequencies, thereby filtering the spurious response signals ahead of the final detector. However, spurious responses that appear within the IF band will not be attenuated by the IF filter. This technique of spur avoidance works well in case of narrow band RF signals.

For wireless broadband systems, such as 802.16e, RF signal bandwidth could be more than 20 MHz and it is very difficult to avoid spurious responses in the desired IF bandwidth. For example, suppose a 768 MHz sinusoidal clock signal is fed to transmitter digital-to-analog devices (DAC) in an 802.16e Base Station (BS), where the clock signal is divided by two to produce a square wave clock signal at 384 MHz. If the receiver is tuned to exactly 3.456 GHz, the ninth harmonic of this signal is also a sinusoid at 3456 MHz. This continuous waveform may be radiated from a digital section of a transceiver (TRX) board inside a casting of a transceiver and may be coupled into the front-end circuitry of the receiver side of the transceiver, where the signal gets mixed down to the IF within the desired signal bandwidth. Mathematically, this can be expressed as

[(768 MHz/2)×9]−(LO frequency 2988 MHz)=3.456 GHz−2988 MHz=IF frequency 456 MHz where the LO frequency is 2988 MHz to get an IF frequency of 456 MHz.

Unlike other wireless broadband systems such as CDMA, where processing gain naturally provides spur suppression, an OFDMA system is very susceptible to the spur inside the desired signal bandwidth. It is very difficult to avoid spurious responses for wireless broadband OFDMA signals in RF design. Therefore a need exists for a simple and effective method of digital spur cancellation that may be implemented in baseband processing.

BRIEF DESCRIPTION OF THE DRAWINGS

FIGS. 9 and 10 are graphical illustrations of an exemplary RSSI after a 1024-point FFT, where a spur with 20 dB power is located at an edge of two subcarriers.

Figure 1:
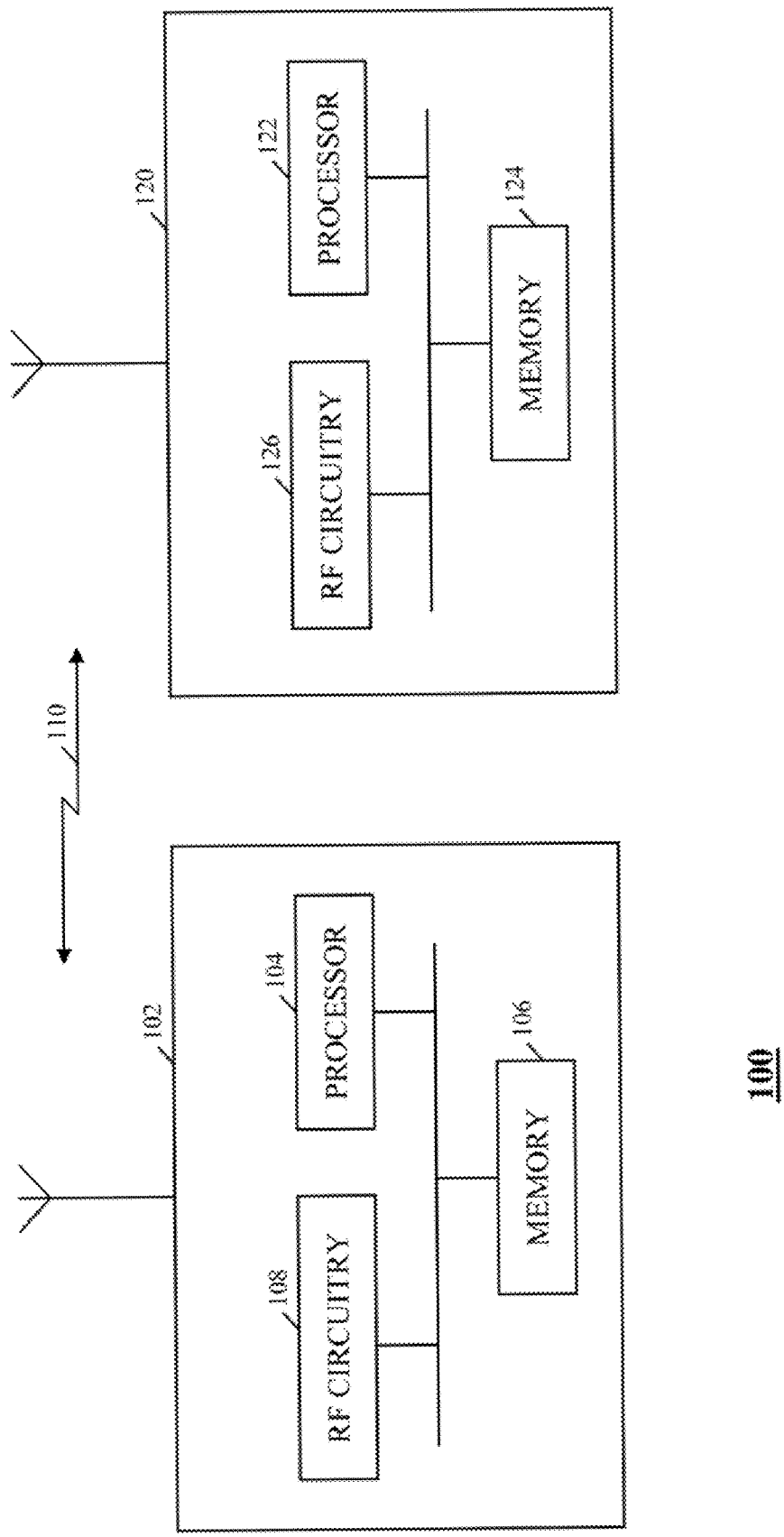
FIG. 1 is a block diagram of a wireless communication system in accordance with an embodiment of the present invention.

One of ordinary skill in the art will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention.

DETAILED DESCRIPTION OF THE INVENTION

To address the need for a simple and effective method of digital spur cancellation that may be implemented in baseband processing, a communication device is provided that is capable of operating in an Orthogonal Frequency Division Multiplexing (OFDM) communication system and that provides for cancellation of in-band spurs. The communication device identifies a bin of multiple bins associated with an output of an inverse transformer and comprising a spur and estimates one or more spur phase parameters and a spur amplitude in association with the identified bin. In various embodiments of the present invention, the one or more spur phase parameters includes a spur initial phase and/or a spur change rate. When the communication device receives a signal from another communication device, the communication device transforms the received signal to produce a multiple parallel output signals, wherein each output signal of the multiple parallel output signals is associated with a bin of the multiple bins, and cancels a spur in an output signal of the multiple parallel output signals that is associated with the identified bin based on the estimated one or more spur phase parameters and spur amplitude.

Generally, an embodiment of the present invention encompasses a method for spur cancellation in an OFDM communication system. The method includes identifying a bin of multiple bins associated with an output of an inverse transformer and comprising a spur, estimating one or more spur phase parameters and a spur amplitude in association with the identified bin, transforming a received signal to produce multiple parallel output signals, wherein each output signal of the multiple output signals is associated with a bin of the multiple bins, and canceling a spur in an output signal of the multiple parallel output signals based on the estimated one or more spur phase parameters and the estimated spur amplitude, wherein the output signal is associated with the identified bin.

Another embodiment of the present invention encompasses a communication device capable of operating in an OFDM communication system and comprising a processor that is configured to identify a bin of multiple bins associated with an output of an inverse transformer and comprising a spur, estimate one or more spur phase parameters and a spur amplitude in association with the identified bin, transform a received signal to produce multiple parallel output signals, wherein each output signal of the multiple parallel output signals is associated with a bin of the multiple bins, and cancel a spur in an output signal of the multiple parallel output signals based on the estimated spur amplitude and phase, wherein the output signal is associated with the identified bin.

Still another embodiment of the present invention encompasses a receiver capable of operating in an OFDM communication system, the receiver comprising a main signal path and an auxiliary circuit coupled to the main signal path. The main signal path receives a transmitted signal to produce a received signal and transforms the received signal to produce a plurality of parallel output signals, wherein each output signal of the plurality of parallel output signals is associated with a bin of multiple bins. The auxiliary circuit identifies a bin of the multiple bins that is associated with an output of an inverse transformer and comprising a spur, estimates one or more spur phase parameters and a spur amplitude in association with the identified bin, and cancels a spur in an output signal of the multiple parallel output signals based on the estimated one or more spur phase parameters and spur amplitude, wherein the output signal is associated with the identified bin.

The present invention may be more fully described with reference to FIGS. 1-10. FIG. 1 is a block diagram of a wireless communication system 100 in accordance with an embodiment of the present invention. Communication system 100 includes a transmitting wireless communication device 102 and a receiving wireless communication device 120 that communicate via an air interface 110. In various embodiments of the presents invention, one of the transmitting and receiving wireless communication devices 102, 120 may be a fixed wireless communication device, for example, a Node B, an Access Point, or a Base Transceiver Station (BTS), that provides wireless communication services to the other wireless communication device, for example, a mobile station, or both of the first and second wireless communication devices 102, 120 may be mobile or portable wireless communication devices, or both of the transmitting and receiving wireless communication devices 102, 120 may be fixed wireless communication devices.

Transmitting communication device 102 comprises a transmitter that includes radio frequency (RF) circuitry 108 for upconverting signals to RF and transmitting signals via air interface 110, a processor 104 coupled to the RF circuitry, such as one or more microprocessors, microcontrollers, digital signal processors (DSPs), field programmable gate arrays (FPGAs), combinations thereof or such other devices known to those having ordinary skill in the art, and one or more memory devices 106 coupled to the processor and RF circuitry, such as such as random access memory (RAM), dynamic random access memory (DRAM), and/or read only memory (ROM) or equivalents thereof, that store data and programs that may be executed by the corresponding processor. The particular operations/functions of processor 104 are determined by an execution of software instructions and routines that are stored in the one or more memory devices 106.

Receiving communication device 120 comprises a receiver that includes RF circuitry 126 for receiving signals via air interface 110, amplifying the received signals, and downconverting the received signals, for example, to an intermediate frequency (IF) and/or a baseband frequency, a processor 122 coupled to the RF circuitry, such as one or more microprocessors, microcontrollers, digital signal processors (DSPs), field programmable gate arrays (FPGAs), combinations thereof or such other devices known to those having ordinary skill in the art, and one or more memory devices 124 coupled to the processor and RF circuitry, such as such as random access memory (RAM), dynamic random access memory (DRAM), and/or read only memory (ROM) or equivalents thereof, that store data and programs that may be executed by the corresponding processor. The particular operations/functions of processor 122 are determined by an execution of software instructions and routines that are stored in the one or more memory devices 124.

Communication system 100 comprises an Orthogonal Frequency Division Multiple Access (OFDMA) air interface technology, wherein a frequency bandwidth is split into multiple frequency sub-bands, or subcarriers, that comprise the physical layer channels over which traffic and signaling channels are transmitted simultaneously. A user may then be assigned one or more of the frequency sub-bands for an exchange of user information, thereby permitting multiple users to transmit simultaneously on the different sub-carriers. Further, communication system 100 may operate in accordance with any wireless communication standard employing an Orthogonal Frequency Division Multiplexing (OFDM) scheme, such as a 3GPP (Third Generation Partnership Project) E-UTRA (Evolutionary UMTS Terrestrial Radio Access) communication system, a 3GPP2 (Third Generation Partnership Project 2) Evolution communication system, for example, a CDMA (Code Division Multiple Access) 2000 1XEV-DV communication system, a Wireless Local Area Network (WLAN) communication system as described by the IEEE (Institute of Electrical and Electronics Engineers) 802.xx standards, for example, the 802.11, 802.16, or 802.21 standards, or any of multiple proposed ultrawideband (UWB) communication systems.

Figure 2:
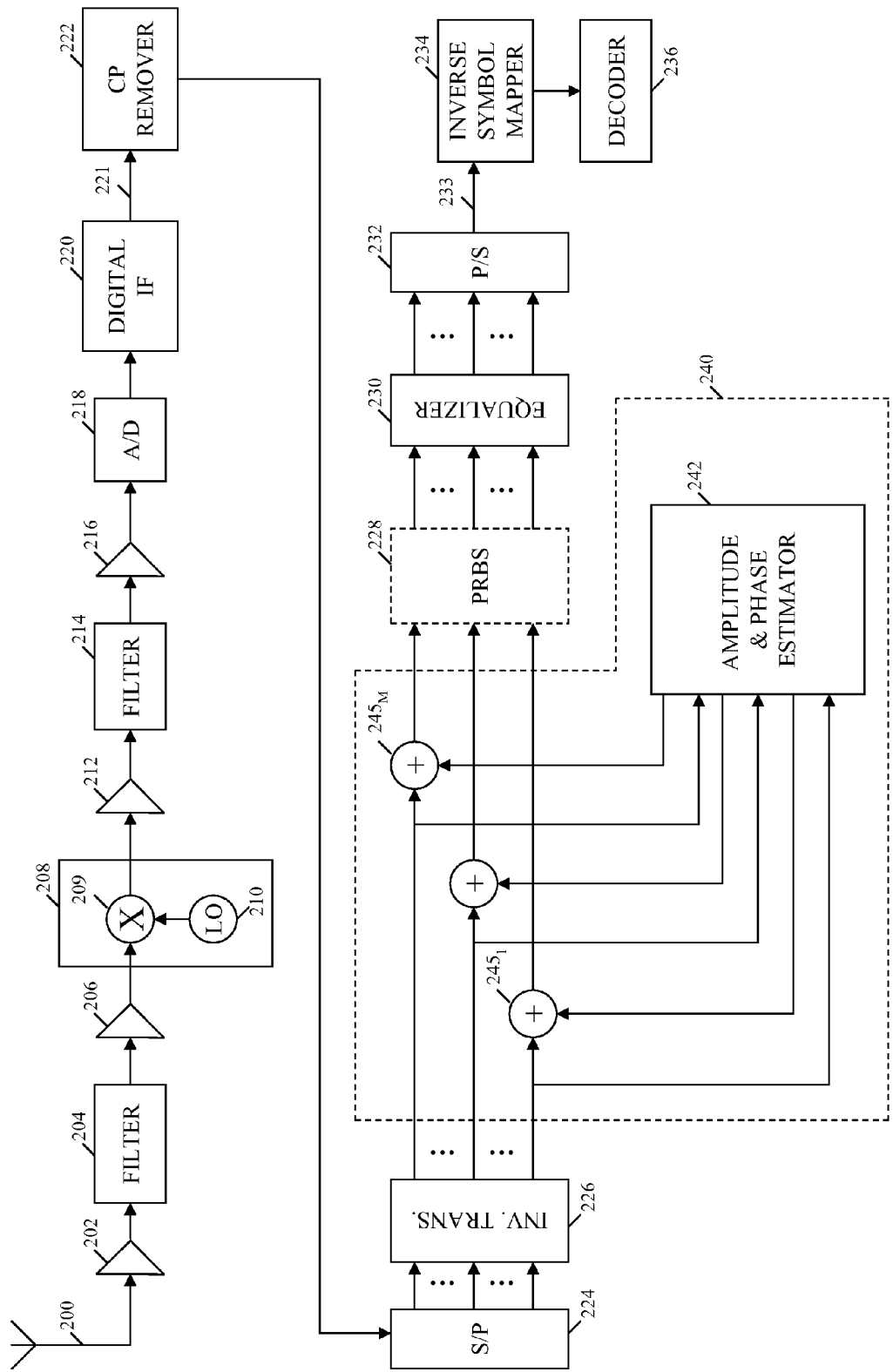
FIG. 2 is a block diagram of a receiving wireless communication device of FIG. 1 in accordance with an embodiment of the present invention.

Referring now to FIG. 2, a block diagram is provided illustrating receiving wireless communication device 120, and more particularly the receiver, in accordance with an embodiment of the present invention. While FIG. 2 depicts a Single Conversion receiver with Digital Intermediate Frequency (Digital IF), FIG. 2 is provided merely to illustrate an operation of the present invention and is not intended to limit the invention with respect to the type of receivers in which the present invention may be employed. For example, based on the descriptions provided herein, one of ordinary skill in the art would be able to easily implement the present invention in a Dual Conversion receiver or a Direct Conversion receiver as well as the illustrated Single Conversion receiver with Digital IF.

Receiving communication device 120 includes a main signal path comprising an antenna 200, a first amplifier 202 that is coupled to a first filter 204, a second amplifier 206 coupled to filter 204, a downconverter 208 coupled to amplifier 206, a third amplifier 212 coupled to the downconverter, a second, IF filter 214 coupled to amplifier 212, a fourth amplifier 216 coupled to the IF filter, an analog-to-digital converter (A/D) 218 coupled to amplifier 216, a Digital IF 220 coupled to the A/D, a cyclic prefix (CP) remover 222 coupled to Digital IF 220, a serial-to-parallel (S/P) converter 224 coupled to the CP remover, an inverse transformer 226, which is anFast Fourier Transform (FFT) in OFDM systems, coupled to the S/P converter, an equalizer 230 coupled to the inverse transformer, a parallel-to-serial (P/S) converter 232 coupled to the equalizer, an inverse symbol mapper 234 coupled to the P/S converter, and a decoder 236 coupled to the inverse symbol mapper. In a WiMAX communication system, receiving communication device 120 may further include a PRBS (pseudo random bit sequence) 228 interposed between inverse transformer 226 and equalizer 230.

Receiving communication device 120 further includes an auxiliary circuit 240 that is coupled to the main signal path and that provides digital spur cancellation in communication device 120. Auxiliary circuit 240 includes an amplitude and phase estimator (APE) 242 and multiple, for example, 'M,' adders $245_1$-$245_M$, wherein each adder $245_1$-$245_M$ is associated with a frequency domain subcarrier, or bin, of multiple frequency domain subcarriers, or bins, output by inverse transformer 226. In one embodiment of the present invention, the functionality described herein as being performed by elements 202, 204, 206, 208, 212, 216, and 218 are implemented in RF circuitry 126 and the functionality described herein as being performed by elements 220, 222, 224, 226, 228, 230, 232, 234, and 240 are implemented by processor 122 based on instructions maintained in at least one memory device 124. However, one of ordinary skill in the art realizes that various elements alternatively may be implemented in either the RF circuitry or processor and in software and/or hardware, for example, integrated circuits (ICs), application specific integrated circuits (ASICs), field programmable gate arrays (FPGAs), and the like, such as ASICs implemented in one or more of wireless communication devices 102, 120. Based on the present disclosure, one skilled in the art will be readily capable of producing and implementing such software and/or hardware without undo experimentation.

Auxiliary circuit 240 operates to provide digital cancellation of in-band spurs in receiving communication device 120. In order to understand the operation of auxiliary circuit 240, an overview of the operation of receiving communication device 120 is first described. Receiving communication device 120 receives a radio frequency (RF) signal at antenna 200 and routes the RF signal to first amplifier 202. Amplifier 202 amplifies the RF signal and routes the amplified signal to first filter 204, such as a low pass or a band pass filter. Filter 204 filters out-of-band noise from the RF signal and routes the filtered RF signal to second amplifier 206, which amplifies the filtered RF signal and routes the amplified filtered RF signal to downconverter 208. Downconverter 208 downconverts the RF signal to a predetermined intermediate frequency (IF) to produce an IF signal. For example, as depicted in FIG. 2, downconverter 208 may comprise a mixer 209 coupled to a local oscillator (LO) 210. Mixer 209 receives the amplified filtered signal from second amplifier 206 and further receives a reference signal from LO 210, which reference signal is designed to facilitate a downconversion of the amplified filtered signal to an intermediate frequency (IF). Mixer 209 then multiplies the amplified filtered RF signal and the reference signal to produce the IF signal, which IF signal is routed to third amplifier 212.

Amplifier 212 amplifies the IF signal and routes the amplified IF signal to second, IF filter 214, typically a band pass filter, which filters out-of-band noise from the amplified IF signal. However, spurious responses that appear within the IF band typically are not attenuated by the IF filter. IF filter 214 then routes the filtered amplified IF signal to fourth amplifier 216, which amplifies the filtered amplified IF signal and routes the amplified signal to A/D 218. A/D 218 digitizes the IF signal received from amplifier 216 to produce a digital IF signal and routes the digital IF signal to Digital IF 220. Digital IFs are well known in the art and will not be described in detail herein, except as follows. Digital IF 220 includes a downconverter (not shown) that downconverts the digitized IF signal received from A/D 214 from IF to a zero IF, or baseband, frequency to produce a digital baseband signal. Digital IF 216 further includes multiple serially coupled filters (not shown) that filter the digital baseband signal to produce a reduced sample rate signal 221 with improved selectivity.

Digital IF 220 then routes digital baseband signal 221 to CP remover 222. CP remover 222 removes a cyclic prefix that had been appended to the signal by a corresponding CP adder in transmitting communication device 102. CP remover 222 then conveys the cyclic prefix-less signal to S/P converter 224. S/P converter 224 converts the baseband, prefix-less signal from a serial form to a parallel form, outputting multiple, for example, 'M,' parallel modulated subcarriers. The multiple, that is, 'M,' parallel modulated subcarriers are conveyed to inverse transformer 226, such as a discrete Fourier Transform (DFT) or a fast Fourier Transform (FFT), that transforms each subcarrier of the 'M' parallel modulated subcarriers from a time domain to a frequency domain based upon a corresponding orthogonal function of 'M' orthogonal functions used in a transformer in transmitting communication device 102. That is, inverse transformer 226 transforms each symbol to a frequency domain subcarrier, or bin, associated with the time domain signals to produce multiple, that is, 'M,' parallel symbols. The output of inverse transformer 226 then includes the multiple, that is, 'M,' parallel symbols based on the 'M' modulated subcarriers, wherein each symbol of the 'M' parallel encrypted symbols is drawn from the possible symbols of a constellation applied by a symbol mapper (not shown) in transmitting communication device 102.

Inverse transformer 226 conveys the 'M' parallel symbols to equalizer 230, or in the case of a WiMAX receiver, to PRBS 228, via adders $245_1$-$245_M$, wherein each adder is associated with a frequency domain subcarrier, or bin, output by the inverse transformer. In addition to receiving the output of inverse transformer 226, one or more adders of adders $245_1$-$245_M$ also receives, from APE 242, a signal corresponding to a negative of an estimate of a spur detected by the APE in the associated bin. When an adder $245_1$-$245_M$ receives an output of inverse transformer 226 and a negative of a spur signal from APE 242, the adder adds the two received signals, thereby canceling a spur in the output for that bin of inverse transformer 226 and producing a spur-canceled signal. The spur-canceled signal is then routed by the adder to equalizer 230 or PRBS 228, whichever is appropriate. In another embodiment of the present invention, in addition to receiving the output of inverse transformer 226, one or more adders of adders $245_1$-$245_M$ also receives, from APE 242, a signal corresponding to estimate of a spur detected by the APE in the associated bin. The adder then subtracts the received estimate of the spur from the received output of inverse transformer 226 in order to cancel a spur in the output for that bin and to produce the spur-canceled signal.

In the event that the communication system includes PRBS 228, the PRBS removes the PRBS modulation from each received signal of the 'M' parallel signals and routes the PRBS modulation-less signals to equalizer 230. Equalizer 230 receives the 'M' parallel outputs of inverse transformer 226 or PRBS 228, whichever is appropriate, performs equalization on each of the 'M' parallel outputs in accordance with any one or more of many well-known equalization techniques, and routes the equalized 'M' parallel outputs to P/S 232. P/S 232 converts the equalized 'M' parallel outputs from a parallel form to a serial form produce a symbol stream 233 and routes the symbol stream to inverse symbol mapper 234. The inverse symbol mapper produces a bit stream by recovering the bits corresponding to each symbol based on the symbol mapping scheme used by the symbol mapper of transmitting communication device 102. The inverse symbol mapper then conveys the recovered bit stream to decoder 236. Decoder 236 decodes the bit stream based on the error correction code applied by an encoder (not shown) of transmitting communication device 102 and conveys the decoded bit stream to a data sink (not shown).

Figure 3:
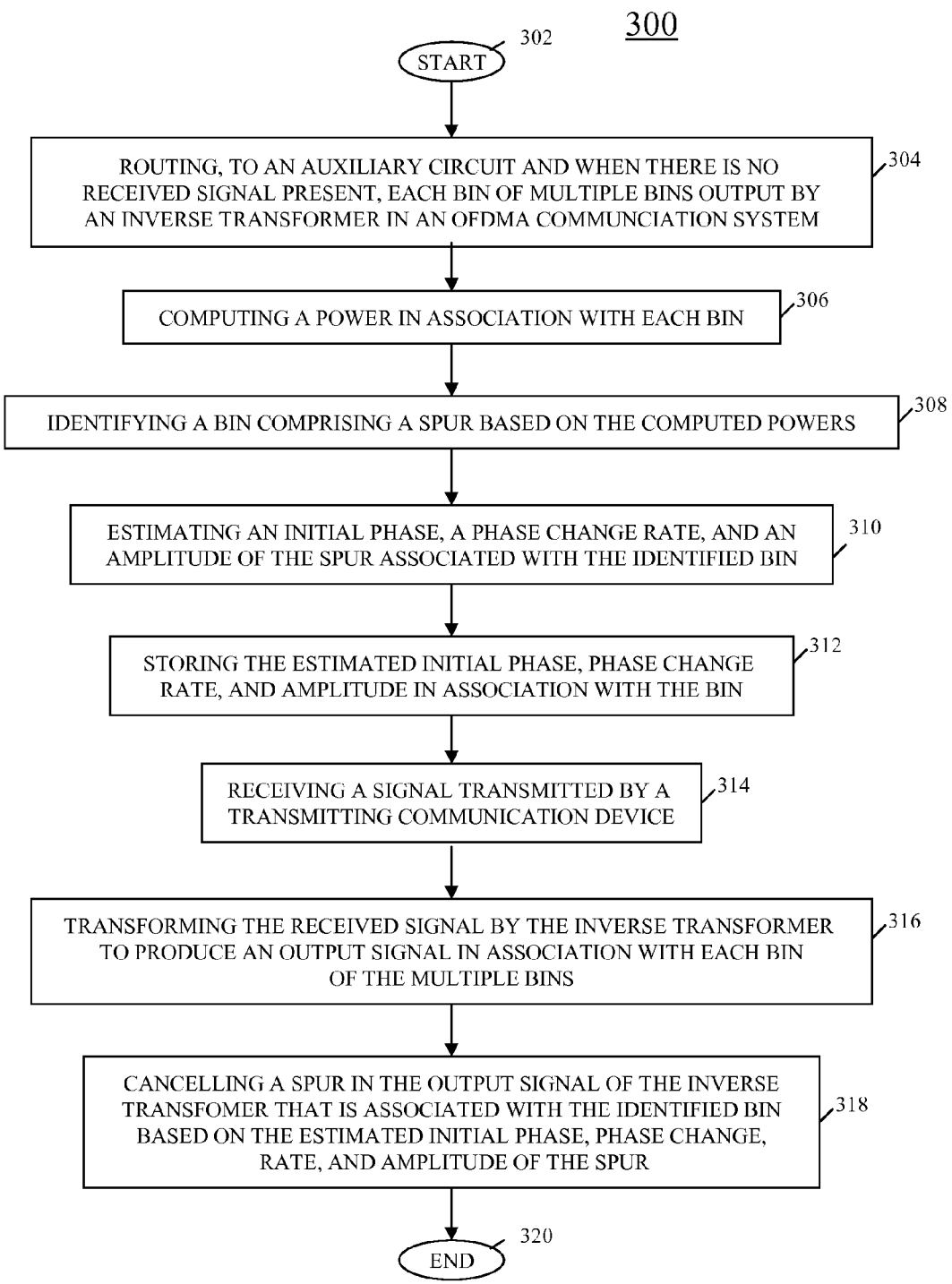
FIG. 3 is a logic flow diagram illustrating a method executed by an auxiliary circuit of a receiving communication device of FIG. 1 in performing spur cancellation in accordance with an embodiment of the present invention.

Referring now to FIG. 3, a logic flow diagram 300 is provided that illustrates a method executed by auxiliary circuit 240 in performing spur cancellation in accordance with an embodiment of the present invention. In a baseband signal in an OFDM communication system, such as system 100, a spur can be represented by a complex pure tone waveform that is given as $$Ae^{j(2\pi ft+\phi)} \; t=0,1,2,3,\ldots,$$

where A is an amplitude of the spur, f is a frequency of the spur in a fraction of a system sampling frequency, $\phi$ is an arbitrary initial phase, and t is an index of sampling instance. Samples of a desired signal are denoted $d_t$, and these samples may be corrupted by Additive White Gaussian Noise (AWGN) $z_t$. Since the spur is added to the desired signal according to a known spur generation mechanism, samples fed by receiving communication device 120 to an OFDMA demodulator (elements 224, 226, 228, 230, and 232) can be expressed as $$r_t = d_t + Ae^{j(2\pi ft+\phi)} + z_t, \; t=0,1,2,3,\ldots.$$

These samples are formed into groups of N-samples, where N is the number of samples per OFDM symbol, and are fed to inverse transformer 226. Consequently, the inverse transformer, for example, FFT, output for a pth OFDM symbol (that is, a pth group of N-samples) on an nth subcarrier can be expressed as $$\tilde{S}_n(p) = \frac{1}{N} \sum_{k=-N/2}^{N/2-1} r_{k+(p-1)N+pN_{CP}} e^{-j2\pi \frac{n}{N} k}$$

$$= \frac{1}{N} \sum_{k=-N/2}^{N/2-1} (d_{k+(p-1)N+pN_{CP}} + Ae^{j[2\pi f(k+(p-1)N+pN_{CP})+\phi]} + z_{k+(p-1)N+pN_{CP}}) e^{-j2\pi \frac{n}{N} k}$$

$$= S_n(p) + Z_n + Ae^{j[2\pi f((p-1)N+pN_{CP})+\phi]} \frac{1}{N} \sum_{k=-N/2}^{N/2-1} e^{j2\pi(f-\frac{n}{N})k}$$

$$= S_n(p) + Z_n + Ae^{j[2\pi f((p-1)N+pN_{CP})+\phi]} B_n e^{j\theta_n}$$

$$= S_n(p) + Z_n + A_n e^{j[2\pi f((p-1)N+pN_{CP})+\phi_n]}$$

where $N_{CP}$ is number of samples of cyclic prefix (CP) that is removed before inverse transformer 226, $S_n(p)$ is a received QAM symbol on the pth OFDM symbol and the nth subcarrier, $Z_n$ corresponds to AWGN, $A_n = AB_n$ and $\phi_n = \phi + \theta_n$. $B_n$ and $\theta_n$ are amplitude and phase of the complex number $$\frac{1}{N} \sum_{k=-N/2}^{N/2-1} e^{j2\pi(f-n/N)k},$$

respectively. When f=m/N, which is the case that the digital spur is located in the center of subcarrier m, the inverse transformer output for the nth subcarrier is given as $$\tilde{S}_n(p) = \begin{cases} S_m(p) + Z_m + Ae^{j[2\pi f((p-1)N + pN_{CP}) + \phi]} & n \in [-N_d/2, N_d/2] \\ S_n(p) + Z_n & n \neq m \end{cases}$$

where $N_d$ is the number of data subcarriers. That is, only the mth subcarrier is affected by the spur. In a general case, when the spur resides in subcarrier m and is offset $\delta$ from the center the subcarrier (that is, $\delta$ is the difference between the bin (subcarrier) center frequency and the frequency of the spur), that is, $f=(m+\delta)/N$ where the absolute value of $\delta$ is less than 0.5, the inverse transformer output is $$\tilde{S}_n(p) = S_n(p) + Z_n + A_n e^{j\phi_n} e^{j\Delta\Phi(m+\delta)p} \quad n \in [-N_d/2, N_d/2]$$

where $e^{j\Delta\Phi(m+\delta)p}$ indicates that the spur phase change is a linear function of p, that is, the OFDM symbol index, and $\Delta\Phi(m+\delta)$ is a phase change rate of the spur and is a function of $(m+\delta)$, which is independent of subcarrier index n. However, the magnitude $A_n = AB_n$ and initial phase $\phi_n = \phi + \theta_n$ of the spur on subcarrier n depends on the subcarrier index n. The equation above represents a fundamental idea underlying spur cancellation herein, that is, that a spur added to a time domain signal can be cancelled in the frequency domain by subtracting a reconstructed frequency domain complex waveform. The complex waveform may be determined by three parameters: an amplitude $A_n$, an initial phase $\phi_n$, and a phase change rate over OFDM symbols $\Delta\Phi(m+\delta)$. In the following, a number of methods will be presented to determine these three parameters.

Theoretically, all subcarriers are affected by the spur if $\delta \neq 0$, since $A_n \neq 0$ in this case. However, $A_n$ dramatically decreases as n moves away from m. This makes a practical implementation of spur cancellation possible. More specifically, when $\delta = 0$, the spur cancellation is performed for subcarrier m only; otherwise, the spur cancellation needs to be performed for two subcarriers, for example, subcarriers m and m+1 when $0 < \delta < 0.5$, or subcarriers m−1 and m when $-0.5 < \delta < 0$.

Figures 6, 7, 8:
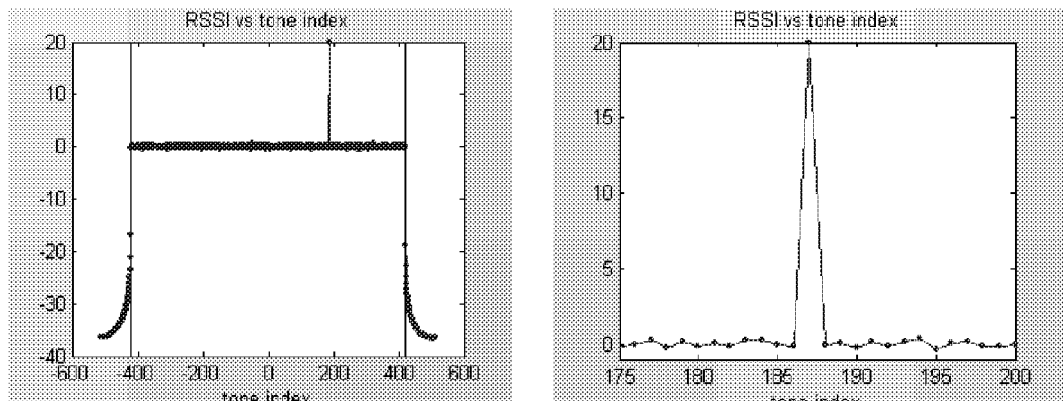
FIG. 6 is a table depicting an exemplary spur phase change rate and amplitude on adjacent subcarriers adjacent to the subcarrier where the spur resides as a function of an offset (δ) of the spur from the center of the subcarrier that includes the spur.
FIGS. 7 and 8 are graphical illustrations of an exemplary receive signal strength indicator (RSSI) after a 1024-point FFT, where a spur with 20 dB power is centered at a subcarrier.

For example, FIG. 6 comprises a table depicting an exemplary spur phase change rate and amplitude on adjacent subcarriers adjacent to the subcarrier where the spur resides as a function of an offset ($\delta$) of the spur from the center of the subcarrier that includes the spur. The table depicted in FIG. 6 shows the phase change rate $\Delta\Phi(m+\delta)$ and $A_{m-1}$, $A_m$, and $A_{m+1}$ as function of $\delta$ corresponding to a spur power of 20 dB and m=185. FIGS. 7-10 then graphically illustrate a receive signal strength indicator (RSSI) after a 1024-point FFT, where a spur with 20 dB power either is centered at a subcarrier, and in particular subcarrier 187, (FIGS. 7 and 8) or located at an edge of two subcarriers, and in particular at an edge of each of subcarriers 187 and 188 (FIGS. 9 and 10).

Another element of a spur seen in the inverse transformer output is the spur's initial phase $e^{j\phi_n}$. This is hard to accurately measure in practice and can be modeled as a random variable that uniformly is distributed within the phase range of $[0\ 2\pi]$ due to very high spur frequency and timing jittering in practice. To accurately cancel the spur, the spur's initial phase should be determined. This can be achieved by an exhaustive search over $[0\ 2\pi]$ for a given search resolution. Simulation results indicate that the required search resolution can be set as coarse as 10 degrees without significant performance degradation. This translates to 36 different initial phases that may be considered. As shown in FIGS. 7-10, a spur can be easily identified by looking at the RSSI in an inverse transformer, for example, FFT, output. Once RSSI associated with a subcarrier is greater than a predetermined threshold, one can determine that a spur has been detected and spur cancellation should be performed on this subcarrier.

Referring again to FIG. 3, logic flow diagram 300 begins (302) when receiving wireless communication device 120 routes (304), to APE 242, each subcarrier, or bin, output by inverse transformer 226 when there is no transmitted signal present at the inverse transformer, for example, when no uplink (UL) signal is applied to the inverse transformer in the event that the receiving communication device is implemented in an infrastructure or no downlink (DL) signal is applied to the inverse transformer in the event that the receiving communication device is implemented in a mobile station. APE 242 then computes (306) a power, preferably an RSSI, of the output of inverse transformer 226 for each bin to produce multiple computed powers. Based on the multiple computed powers, APE 242 identifies (308) a spur location, or bin. That is, for each bin of the multiple bins output by inverse transformer 226, APE 242 compares the computed power for that bin to a corresponding threshold stored in at least one memory device 124 to produce a comparison. Based on the comparisons, and more particularly when a computed power of a bin exceeds the threshold, APE 242 determines that a spur is present in that bin.

In response to detecting the presence of a spur, APE 242 then estimates (310) one or more spur phase parameters, preferably a spur initial phase $\phi_n$ and a spur phase change rate $\Delta\Phi(m+\delta)$, and a spur amplitude $A_n$ in association with the identified bin n, that is, determines an estimated initial phase, phase change rate, and amplitude of the spur, and stores (312), in association with the bin and in one or more memory devices 124 of receiving communication device 120, the estimated initial phase, phase change rate, and amplitude. When receiving communication device 120 receives (314), at antenna 200, a transmitted signal from transmitting communication device 102, (thereby producing a received signal), the receiving communication device routes the received signal though elements 202, 204, 206, 208, 212, 214, 216, 218, 220, 222, and 224 of the main signal path of the receiving communication device, as is described in detail above, to produce multiple, for example, 'M,' parallel baseband signals that are derived from the received signal and that are applied to inverse transformer 226. Inverse transformer 226 then transforms (316) the time domain baseband signals to produce multiple parallel frequency domain output signals, that is, an output signal in association with each subcarrier, or bin, of the multiple subcarriers, or bins, output by the inverse transformer. It may be assumed that the signal output by inverse transformer 226 at step 316 and associated with the bin identified at step 308 will include a spur similar to the spur estimated at step 310. Each output signal of the multiple parallel output signals is then routed to an adder $245_1$-$245_M$ associated with the corresponding bin.

With respect to the bin that has been identified as including a spur, APE 242 also routes a reconstructed spur based on the estimates of $A_n$, $\phi_n$, and $\Delta\Phi(m+\delta)$ for each OFDM symbol p to the corresponding adder $245_1$-$245_M$, where the reconstructed spur is subtracted from the inverse transformer output for that bin. By way of another example, APE 242 may construct a negative of the spur based on the estimates of $A_n$, $\phi_n$, and $\Delta\Phi(m+\delta)$ for each OFDM symbol p, and convey the negative of the spur to a corresponding adder $245_1$-$245_M$ associated with the bin, where the negative of the spur is added to the inverse transformer output for that bin. The adder then cancels (318) the spur included in the output of inverse transformer 226 for the given subcarrier n by subtracting the reconstructed spur from, or adding the negative of the spur to, the output of inverse transformer 226 that is received by the adder, and logic flow 300 ends (320).

Steps 306 and 308 preferably are performed at the outset of the spur detection and may be performed again occasionally after that for update purposes, but need not be performed for each transmitted subframe received by receiving communication device 120. However, steps 310-318 preferably are performed for every transmitted subframe received by the communication device in order to cancel a spur in a subcarrier m.

Figure 4:
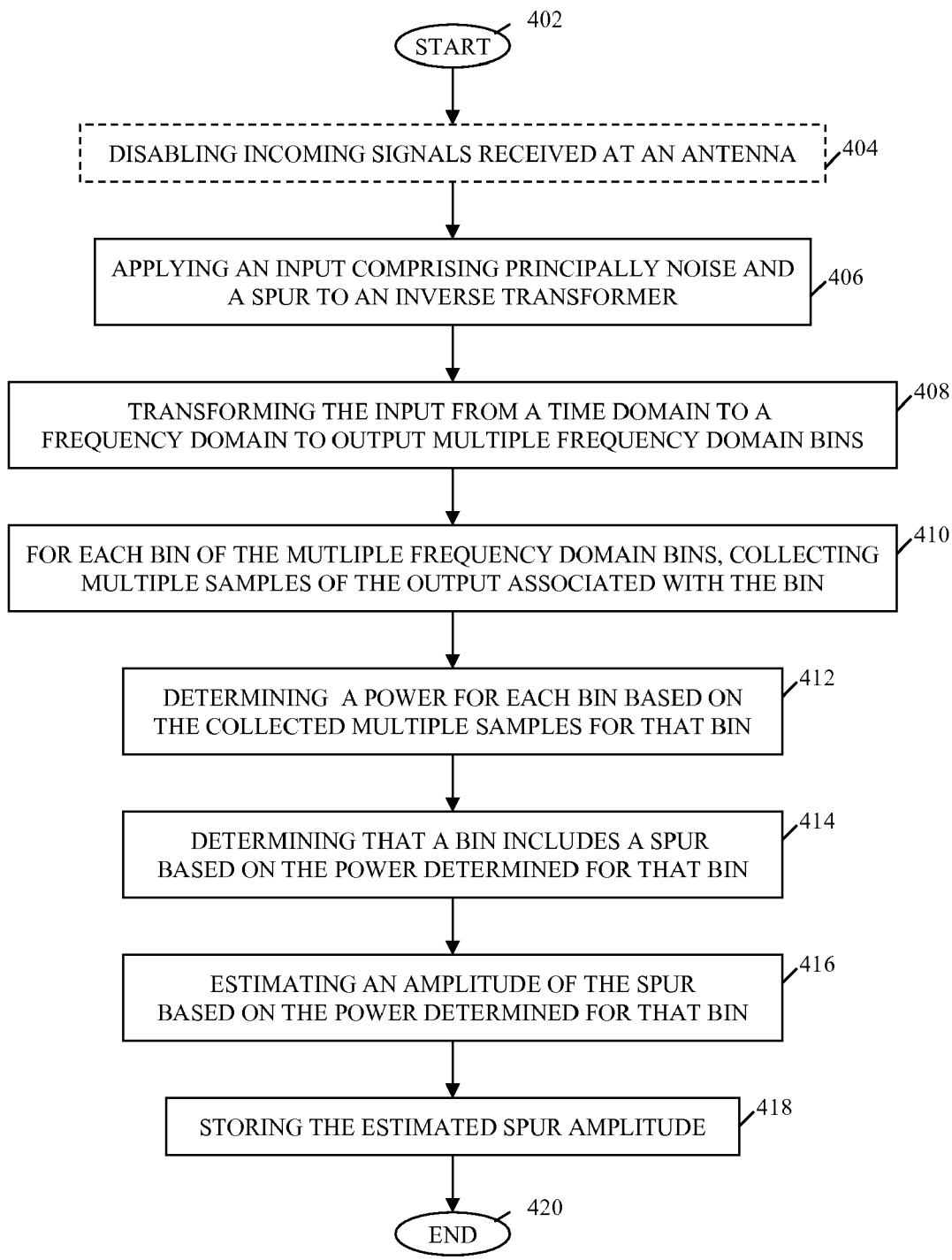
FIG. 4 is a logic flow diagram illustrating an estimating of a spur amplitude by a receiving communication device of FIG. 1 in accordance with an embodiment of the present invention.

Referring now to FIG. 4, a logic flow diagram 400 is provided that depicts an estimating of the spur amplitude $A_n$ by receiving communication device 120 in accordance with an embodiment of the present invention. The method depicted in logic flow diagram 400 preferably is performed when no transmitted signal is present at the input to inverse transformer 226. Logic flow diagram 400 begins (402) when an input comprising principally noise and the spur is applied (406) to inverse transformer 226. In order to assure that the input comprises principally noise and the spur, receiving communication device optionally may disable (404) incoming signals received at antenna 200 from receiver 126. Inverse transformer 226 then transforms (408) the input from a time domain to a frequency domain to output the multiple, or 'M,' subcarriers, or frequency domain bins, which output is coupled to auxiliary circuit 240, and more particularly to APE 242.

For each bin of the multiple frequency domain bins, APE 242 collects (410) multiple samples of the output associated with the bin, which multiple samples may be collected over a single frame or over multiple frames. Based on the collected samples, APE 242 determines (412) a power in association with the bin output (again, when there is no transmitted signal present), that is, determines $$\frac{1}{N}\sum_{n=1}^{N}|y_n|^2$$

over N samples, that is, for n=1, ..., N where $y_n$ denotes the nth sample on the bin when there is no transmitted signal in present. When the power determined for a bin exceeds a corresponding power threshold, APE 242 determines (414) that the bin includes a spur and estimates (416) a power of the spur, and correspondingly an amplitude of the spur, which amplitude may be represented as $$\sqrt{\frac{1}{N}\sum_{n=1}^{N}|y_n|^2},$$

based on the determined power of the bin. APE 242 then stores (418) the estimated spur amplitude in the one or more memory devices 124 of the receiving communication device and logic flow 400 then ends (420). In another embodiment of the present invention, steps 404 to 418 may be repeated until expiration of a time period, τ, that may be dynamically determined based on spur characteristics and environment, such as temperature. The estimated power may be updated upon each iteration or not determined until expiration of time period τ.

In estimating the phase of the spur, APE 242 determines a phase change rate of the spur, based on spur frequency and carrier frequency, and estimates and/or updates an initial phase of the detected spur. In the event that the spur frequency is known, the phase change rate, that is, $\Delta\Phi(m+\delta)$, can be calculated analytically, that is, $\Delta\Phi(f)=2\pi f N_s$. Here $\Delta\Phi(m+\delta)$ is replaced by $\Delta\Phi(f)$ to emphasize that the phase change rate depends on the spur frequency f given the number of samples per OFDM symbol, $N_s$, that includes the cyclic prefix (CP), that is, $N_s=N+N_{CP}$. (One may note that $f=(m+\delta)/N$, where m ranges from $-N/2$ to $N/2$.) In practice, the effective phase change rate is (for simplicity, phase change rate is expressed as a constant, which is true in reality where spur frequency, system carrier frequency, and OFDM symbol interval are all constants)

$$\Delta\Phi=\mathrm{mod}(2\pi f_{relative}T_{symb}, 2\pi)$$

where $f_{relative}=f_{spur}-f_{carrier}$ denotes the frequency difference between actual spur frequency and system carrier frequency and $T_{symb}$ represents OFDM symbol interval including the CP. Clearly, with the relative spur frequency $f_{relative}$, one can determine the spur location in terms of subcarrier index m. Consequently, a more accurate spur amplitude estimate may be determined as follows $$A_m = \frac{1}{P}\left|\sum_{p=1}^{P}\tilde{S}_m(p)\times e^{-j\Delta\Phi\times p}\right|$$

where p is the OFDMA symbol index, P is total number of OFDMA symbols, or samples, used for the amplitude estimation and m denotes the subcarrier where spur cancellation should be performed. The factor $e^{-j\Delta\Phi\times p}$ corresponds to a phase rotator. This is a coherent estimate of the spur amplitude, where a frequency of the spur is known, as opposed to the non-coherent estimate described above, where a frequency of the spur is not known.

In case of unknown spur frequency, APE 242 may also estimate and/or update a phase change rate $\Delta\Phi(m+\delta)$ of the spur by determining a phase change rate over a number of OFDM symbol where there is no transmitted signal in present, $$\Delta\Phi(m+\delta) = \frac{1}{P}\sum_{i=1}^{P}\mathrm{angle}\left[conj(\tilde{S}_m(i-1))\times\tilde{S}_m(1)\right] \text{ and } A_m = \frac{1}{P}\sum_{i=1}^{P}|\tilde{S}_m(i)|$$

where P is the number of OFDM symbols over which the estimate is performed and m is subcarrier index in which the spur is detected, that is, $A_m>T$ where T is threshold for spur detection.

Figure 5:
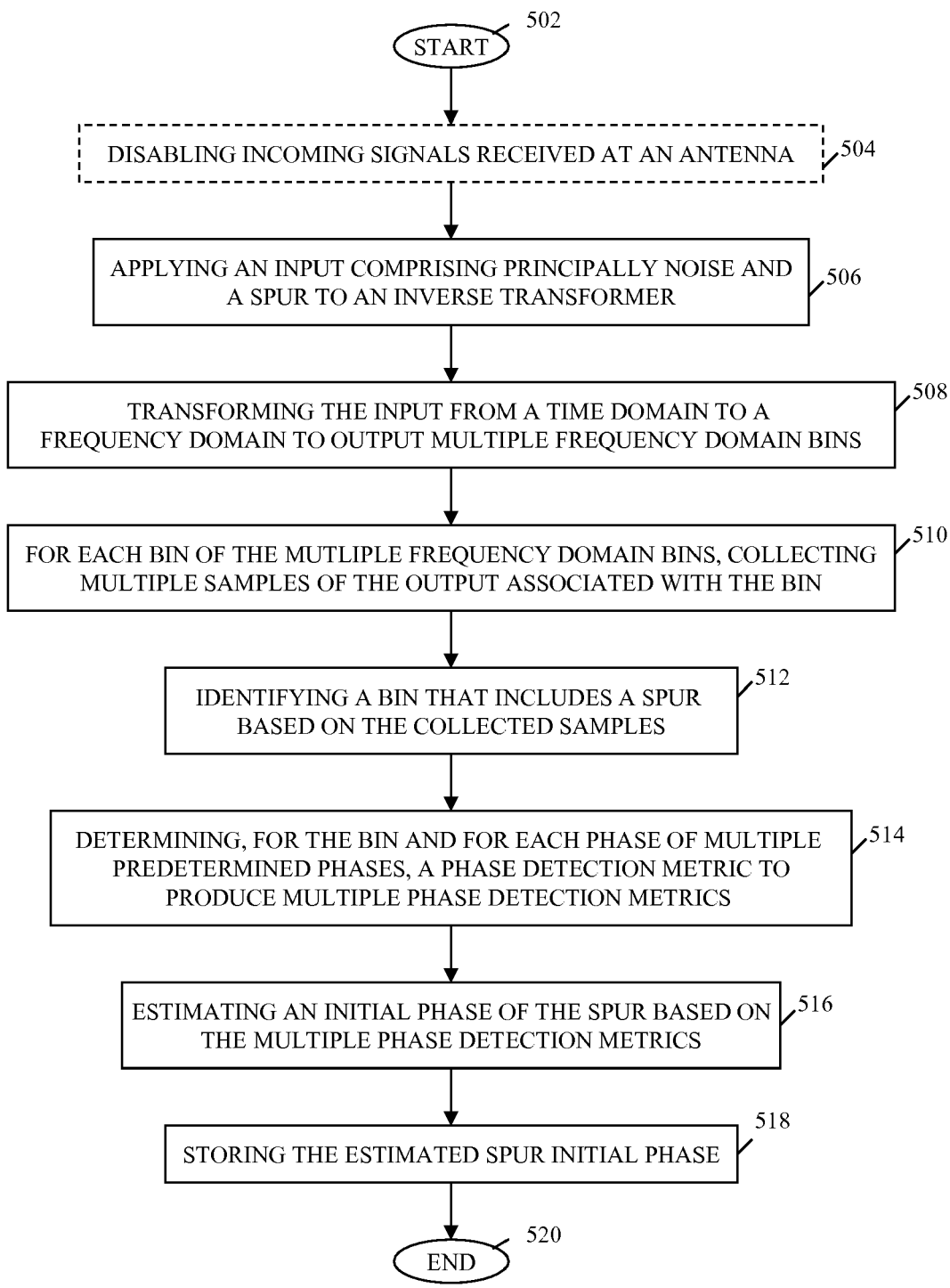
FIG. 5 is a logic flow diagram illustrating an estimating of a spur initial phase by a receiving communication device of FIG. 1 in accordance with an embodiment of the present invention.

Referring now to FIG. 5, a logic flow diagram 500 is provided that depicts an estimating of a spur initial phase by receiving communication device 120 in accordance with an embodiment of the present invention. Similar to logic flow diagram 400, the method depicted in logic flow diagram 500 preferably is performed when no transmitted signal is present at the input to inverse transformer 226. Logic flow diagram 500 begins (502) when an input comprising principally noise and the spur is applied (506) to inverse transformer 226. In order to assure that the input comprises principally noise and the spur, receiving communication device optionally may disable (504) incoming signals received at antenna 200 from receiver 126. Inverse transformer 226 then transforms (508) the input from a time domain to a frequency domain to output the multiple, or 'M,' subcarriers, or frequency domain bins, which output is coupled to auxiliary circuit 240, and more particularly to APE 242.

For each bin of the multiple bins, APE 242 then collects (510) multiple samples of the output associated with the bin (again, when there is no transmitted signal present), which multiple samples may be collected over a single frame or over multiple frames. Based on the multiple samples, and as described in detail with reference to FIG. 4, APE 242 identifies (512) a bin of the multiple bins output by inverse transformer 226 that includes a spur. For the identified bin, or subcarrier, and for each of multiple predetermined possible initial phases, for example, every 10 degrees, which over 360° corresponds to 36 possible initial phase points, APE 242 determines (514) a phase detection metric, each metric corresponding to a possible initial phase of a spur at that sample point. Each phase detection metric may be determined over one or more symbols taken in the bin where a spur is identified. APE 242 then estimates (516) an initial phase of the spur based on the multiple phase detection metrics determined for the multiple possible initial phases, preferably by comparing each phase detection metric of the multiple phase detection metrics to other phase detection metrics of the multiple phase detection metrics to produce multiple comparisons and then estimating a spur phase based on the multiple comparisons, and more particularly selecting an initial phase that corresponds to the minimum determined phase detection metric.

That is, in one embodiment of the present invention, APE 242 may determine an initial phase of the detected spur using an exhaustive search. That is, for every identified subcarrier m and within one uplink (UL) subframe (for example 15 OFDM symbols in Partial Usage of Subchannels (PUSC) mode), APE 242 detects an initial phase of a spur using an exhaustive search for the initial phase based on a given search resolution (that is, searching by assuming a number of possible spur initial phases, for example, sampling every 10 degrees, which over 360° corresponds to 36 possible initial phases), that is, computes a phase detection metric that indicates an initial phase of the spur, for example, computes a phase detection metric $$Y_m^{(k)}(p) = \tilde{S}_m(p) - A_m e^{j\Phi k} e^{j\Delta\Phi(m+\delta)p} \; p=1, 2, \ldots, 15 \text{ and } k=1, 2, \ldots, 36.$$

In other words, APE 242 determines an initial phase by determining a reconstructed spur using the estimated spur amplitude, phase change rate and a possible spur initial phase and further determines a difference, Y, between the signal on the bin and the reconstructed spur. APE 242 then sums $Y_m^{(k)}(p)$ over the P, for example, P is 15 here, OFDM symbols, which results in K metrics, here K=36 in the example, that is $$M_k = \sum_{p=1}^{15} |Y_m^{(k)}(p)|^2, \, k=1, 2, \ldots, 36.$$

Then the estimated initial phase $\phi_m$ for the spur on subcarrier m is given by the value indexed by k among 36 possible phases, where k indexes the minimum metric out of the 36 metrics. For example, if all possible phases are 0, 10, 20, ..., 350 degrees and $5^{th}$ metric is the minimum one among 36 metrics, i.e. $M_5$ is the minimum metric, so k=5 and $5^{th}$ of the phase values, which is 40 degrees, will be the estimated initial phase for the spur on subcarrier m.

APE 242 stores (518) the estimated spur initial phase in the one or more memory devices 124 of the receiving communication device and logic flow 500 then ends (520). In another embodiment of the present invention, APE 242 may repeat steps 508, 510, 512, 514, and 516 and calculate, for each iteration, a running average of the initial phase that incorporates the currently determined initial phase and one or more previously determined initial phases and that further may include a weight associated with each of the currently determined, and one or more previously determined, initial phases.

In yet another embodiment of the present invention, where spur frequency is known and the product of a relative frequency, which is a difference between spur frequency and carrier frequency, and a time domain duplex (TDD) frame interval is an integer, the initial phase of a spur seen on each subcarrier is a constant theoretically. Therefore, the initial phase of the spur on each subcarrier estimated in previous frames can be used for a current frame for spur cancellation. In this case, an initial phase of a spur on each subcarrier in each TDD frame can be estimated using the method presented before, that is by exhaustive search over predetermined possible phase points using the phase detection metrics. All estimated initial phases per TDD frame are passed through a smoothing filter for a running average. More particularly, let $\phi_n(k)$ be an estimated initial phase on nth subcarrier in kth TDD frame, then the averaged initial phase $\bar{\phi}_n(k+1)$ on the same subcarrier used for spur cancellation in (k+1)th frame may be given as $$\bar{\phi}_n(k+1) = (1-\lambda)\bar{\phi}_n(k) + \lambda\phi_n(k).$$

Here, λ is a memory factor that takes a value from 0 to 1, for example, λ=0.2. To reduce computational complexity, the exhaustive search for initial phase estimate in kth frame can be performed over a few points around the averaged initial phase $\bar{\phi}_n(k)$, for example, one may search over 10 points instead of 36 points around 360 degrees with resolution 10 degrees. This operation can performed with or without a transmitted signal present.

Similarly, in still another embodiment of the present invention, the spur amplitude on each subcarrier can be estimated within each TDD frame and averaged for spur cancellation within a later frame. More particularly, let $A_n(k)$ be an estimated spur amplitude on nth subcarrier in kth TDD frame, then the averaged spur amplitude $\bar{A}_n(k+1)$ on the same subcarrier used for spur cancellation in (k+1)th frame may be given as $$\bar{A}_n(k+1) = (1-\alpha)\bar{A}_n(k) + \alpha A_n(k).$$

Here, α is a memory factor that takes a value from 0 to 1, for example, α=0.2. In case a transmitted signal is present, the determination of the spur amplitude can be modified as follows $$A_n^2(k) = \frac{1}{P}\sum_{p=1}^{P} |\tilde{S}_n(p)|^2 - \frac{1}{P}\sum_{p=1}^{P} |\tilde{S}_d(p)|^2 \; n \neq d,$$

where the spur amplitude is $A_n(k) = \sqrt{A_n^2(k)}$. Here $\tilde{S}_n(p)$ and $\tilde{S}_d(p)$ are pth received symbols on an nth subcarrier and a dth subcarrier of a current frame, respectively, n denotes the subcarrier with a spur present, and d indexes a subcarrier where there is no spur present. With the analytically calculated spur phase change rate ΔΦ, the averaged initial phase $\bar{\phi}_n(k+1)$ and the averaged amplitude $\bar{A}_n(k+1)$ based on previous frames, a spur can be easily reconstructed for cancellation in (k+1)th frame, and so on.

In sum, a communication device is provided that is capable of operating in an OFDM/OFDMA communication system and that includes a receiver that provides for in-band spur cancellation in a received signal. While the communication devices described herein are described as operating in a wireless communication system, one of ordinary skill in the art realizes that the principles described herein are applicable to the communication devices of any OFDM communication system, whether wireless or wireline. The communication device identifies a bin of multiple bins that is associated with an output of an inverse transformer and that includes a spur and estimates one or more spur phase parameters, preferably a spur initial phase and a spur phase change rate, and a spur amplitude in association with the identified bin. When the communication device receives a transmitted signal, producing a received signal, an inverse transformer of the communication device transforms the received signal to produce multiple parallel output signals, wherein each output signal of the multiple parallel output signals is associated with a frequency domain subcarrier, or frequency domain bin, of multiple subcarriers or bins, and cancels a spur in an output signal of the multiple parallel output signals based on the estimated one or more spur phase parameters and spur amplitude, wherein the output signal is associated with the identified bin.

In various embodiments of the present invention, the communication device may identify the bin including the spur by computing a power for each bin of the multiple bins and identifying a bin including the spur based on the determined powers, preferably by comparing each computed power of the multiple computed powers to a threshold to produce multiple comparisons and identifying a bin including the spur based on the multiple comparisons. The communication device may further determine an amplitude of the spur based on the computed power associated with the identified bin.

In one embodiment of the present invention, the communication device may estimate the spur phase change rate over multiple OFDM symbols based on the output of the inverse transformer when there is no transmitted signal present; however, in another embodiment of the present invention, the communication device may estimate the spur phase change rate over multiple OFDM symbols based on a known spur frequency and a known carrier frequency when a transmitted signal is present.

In various embodiments of the present invention, the communication device may determine an initial phase of the spur by estimating a phase detection metric for the identified bin, preferably by determining multiple possible spur initial phases and computing a phase detection metric for each possible initial phase. The communication device then may estimate the spur initial phase based on the phase detection metric(s), for example, by comparing each phase detection metric of the multiple phase detection metrics to other phase detection metrics of the multiple phase detection metrics to produce multiple comparisons and estimating a spur phase based on the multiple comparisons. A phase detection metric for a possible spur initial phase (of multiple possible spur initial phases) may be determined by reconstructing the spur using the estimated spur amplitude, phase change rate, and the possible spur initial phase, determining a difference between the signal in the identified bin and the reconstructed spur, and summing the difference over more than one OFDM symbol. A spur initial phase may then be selected based on the summed differences for each possible initial phase, preferably by selecting the minimum of the summed differences.

The spur then may be reconstructed, or a negative of the spur may be constructed, based on the estimated spur amplitude, initial phase, and phase change rate. When a signal is received from a transmitting communication device and the received signal transformed to produce multiple inverse transformer output signals, the reconstructed spur may be subtracted from, or the negative of the spur may be added to, an inverse transformer output signal associated with the identified bin to cancel a spur in the signal.

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. The terms 'including' and/or 'having', as used herein, are defined as comprising. Furthermore, unless otherwise indicated herein, the use of relational terms, if any, such as first and second, top and bottom, and the like are used solely to distinguish one entity or action from another entity or action without necessarily requiring or implying any actual such relationship or order between such entities or actions. An element preceded by ". . . a" does not, without more constraints, preclude the existence of additional identical elements in the process, method, article, or apparatus that the element.

What is claimed is:

1. A method for spur cancellation in an Orthogonal Frequency Division Multiplexing communication system comprising:

identifying a bin of a plurality of bins associated with an output of an inverse transformer and comprising a spur;

estimating one or more spur phase parameters and a spur amplitude in association with the identified bin, wherein estimating comprises determining a phase detection metric for the identified bin and estimating a spur initial phase based on the phase detection metric and wherein determining a phase detection metric comprises determining a reconstructed spur using the estimated spur amplitude, phase change rate and a possible spur initial phase, determining at least one difference between the signal on the bin and a reconstructed spur, and summing the difference over more than one Orthogonal Frequency Division Multiplexing symbol;

transforming a received signal to produce a plurality of parallel output signals, wherein each output signal of the plurality of output signals is associated with a bin of the plurality of bins; and canceling a spur in an output signal of the plurality of parallel output signals based on the estimated one or more spur phase parameters and the estimated spur amplitude, wherein the output signal is associated with the identified bin.

2. The method of claim 1, wherein identifying comprises computing a power for each bin of the plurality of bins to produce a plurality of computed powers and identifying a bin based on the determined powers.

3. The method of claim 2, wherein identifying further comprises comparing each computed power of the plurality of computed powers to a threshold to produce a plurality of comparisons and identifying a bin based on the plurality of comparisons.

4. The method of claim 1, wherein estimating one or more spur phase parameters comprises estimating a spur phase change rate over Orthogonal Frequency Division Multiplexing symbols based on a known spur frequency and a known carrier frequency.

5. The method of claim 1, wherein estimating one or more spur phase parameters comprises estimating a spur phase change rate over Orthogonal Frequency Division Multiplexing symbols based on the output of an inverse transformer when there is no transmitted signal in present.

6. The method of claim 1, wherein estimating a spur amplitude comprises computing a power for the identified bin and determining a spur amplitude based on the computed power.

7. The method of claim 1, wherein determining a phase detection metric comprises:
determining multiple possible spur initial phases; and
computing a phase detection metric for each possible initial phase of the multiple possible spur initial phases.

8. The method of claim 1, wherein determining a phase detection metric comprises determining a phase detection metric for each phase of a plurality of predetermined phases to produce a plurality of phase detection metrics and wherein estimating a spur initial phase comprises estimating a spur initial phase based on the plurality of phase detection metrics.

9. The method of claim 8, wherein determining a phase detection metric further comprises comparing each phase detection metric of the plurality of phase detection metrics to other phase detection metrics of the plurality of phase detection metrics to produce a plurality of comparisons and wherein estimating a spur initial phase comprises estimating a spur initial phase based on the plurality of comparisons.

10. The method of claim 1, wherein canceling a spur in an output signal of the plurality of parallel output signals comprises:
determining a reconstructed spur based on the estimated one or more spur phase parameters and the estimated spur amplitude; and
subtracting the reconstructed spur from the output signal.

11. The method of claim 1, wherein canceling a spur in an output signal of the plurality of parallel output signals comprises:
determining a negative of a spur based on the estimated one or more spur phase parameters and the estimated spur amplitude; and
subtracting the negative of a spur from the output signal.

12. The method of claim 1, wherein the one or more spur phase parameters comprise a spur initial phase, and wherein the method further comprises:
determining a running average of the estimated spur initial phase and amplitude when a transmitted signal is present; and
storing the averaged spur initial phase and amplitude.

13. The method of claim 1, wherein the one or more spur phase parameters and a spur amplitude are estimated without a transmitted signal present and wherein the method further comprises storing the estimated one or more spur phase parameters and a spur amplitude.

14. A communication device capable of operating in an Orthogonal Frequency Division Multiplexing communication system and comprising a processor that is configured to identify a bin of a plurality of bins associated with an output of an inverse transformer and comprising a spur, estimate one or more spur phase parameters and a spur amplitude in association with the identified bin, wherein estimating comprises determining a phase detection metric for the identified bin and estimating a spur initial phase based on the phase detection metric and wherein determining a phase detection metric comprises determining a reconstructed spur using the estimated spur amplitude, phase change rate and a possible spur initial phase, determining at least one difference between the signal on the bin and a reconstructed spur, and summing the difference over more than one Orthogonal Frequency Division Multiplexing symbol, and wherein the processor is further configured to transform a received signal to produce a plurality of parallel output signals, wherein each output signal of the plurality of parallel output signals is associated with a bin of the plurality of bins, and cancel a spur in an output signal of the plurality of parallel output signals based on the estimated one or more spur phase parameters and estimated spur amplitude, wherein the output signal is associated with the identified bin.

15. The communication device of claim 14, wherein the processor is configured to identify a bin of a plurality of bins by computing a power for each bin of the plurality of bins to produce a plurality of computed powers and identifying a bin based on the determined powers.

16. The communication device of claim 15, wherein the processor is configured to identify a bin by comparing each computed power of the plurality of computed powers to a threshold to produce a plurality of comparisons and identifying a bin based on the plurality of comparisons.

17. The communication device of claim 14, wherein the processor is configured to estimate one or more spur phase parameters by estimating a spur phase change rate over Orthogonal Frequency Division Multiplexing symbols based on a known spur frequency and a known carrier frequency.

18. The communication device of claim 16, wherein the processor is configured to estimate one or more spur phase parameters by estimating a spur phase change rate over Orthogonal Frequency Division Multiplexing symbols based on the output of an inverse transformer when there is no transmitted signal in present.

19. The communication device of claim 14, wherein the processor is configured to estimate a spur amplitude by computing a power for the identified bin and determining a spur amplitude based on the computed power.

20. The communication device of claim 14, wherein the processor is configured to determine a phase detection metric by determining multiple possible spur initial phases and computing a phase detection metric for each possible initial phase of the multiple possible spur initial phases.

21. The communication device of claim 14, wherein the processor is configured to determine a phase detection metric by determining a phase detection metric for each phase of a plurality of predetermined phases to produce a plurality of phase detection metrics and estimating a spur initial phase based on the plurality of phase detection metrics.

22. The communication device of claim 21, wherein the processor is configured to determine a phase detection metric by comparing each phase detection metric of the plurality of phase detection metrics to other phase detection metrics of the plurality of phase detection metrics to produce a plurality of comparisons and estimating a spur initial phase based on the plurality of comparisons.

23. The communication device of claim 14, wherein the processor is configured to cancel a spur in an output signal of the plurality of parallel output signals by determining a reconstructed spur based on the estimated one or more spur phase parameters and the estimated spur amplitude and subtracting the reconstructed spur from the output signal.

24. The communication device of claim 14, wherein the processor is configured to cancel a spur in an output signal of the plurality of parallel output signals by determining a negative of a spur based on the estimated one or more spur phase parameters and the estimated spur amplitude and subtracting the negative of a spur from the output signal.

25. The communication device of claim 14 further comprising one or more memory devices coupled to the processor, wherein the one or more spur phase parameters comprise a spur initial phase, and wherein the processor is further configured to determine a running average of the estimated spur initial phase and amplitude when a transmitted signal is present and store the averaged spur initial phase and amplitude in the one or more memory devices.

26. The communication device of claim 14, further comprising one or more memory devices coupled to the processor, wherein the processor is configured to estimate one or more spur phase parameters and a spur amplitude without a transmitted signal present and to store the estimated one or more spur phase parameters and a spur amplitude in the one or more memory devices.

27. A receiver capable of operating in an Orthogonal Frequency Division Multiplexing communication system, the receiver comprising:
a main signal path that receives a transmitted signal to produce a received signal and transforms the received signal to produce a plurality of parallel output signals, wherein each output signal of the plurality of parallel output signals is associated with a bin of a plurality of bins; and
an auxiliary circuit coupled to the main signal path that identifies a bin of the plurality of bins associated with an output of an inverse transformer and comprising a spur, estimates one or more spur phase parameters and a spur amplitude in association with the identified bin, and cancels a spur in an output signal of the plurality of parallel output signals based on the estimated one or more spur phase parameters and estimated spur amplitude, wherein the output signal is associated with the identified bin, wherein estimating one or more spur phase parameters and a spur amplitude in association with the identified bin comprises determining a phase detection metric for the identified bin and estimating a spur initial phase based on the phase detection metric and wherein determining a phase detection metric comprises determining a reconstructed spur using the estimated spur amplitude, phase change rate and a possible spur initial phase, determining at least one difference between the signal on the bin and a reconstructed spur, and summing the difference over more than one Orthogonal Frequency Division Multiplexing symbol.

28. The receiver of claim 27, wherein the auxiliary circuit is configured to identify a bin of a plurality of bins by computing a power for each bin of the plurality of bins to produce a plurality of computed powers and identifying a bin based on the determined powers.

29. The receiver of claim 28, wherein the auxiliary circuit is configured to identify a bin by comparing each computed power of the plurality of computed powers to a threshold to produce a plurality of comparisons and identifying a bin based on the plurality of comparisons.

30. The receiver of claim 27, wherein the auxiliary circuit is configured to estimate one or more spur phase parameters by estimating a spur phase change rate over Orthogonal Frequency Division Multiplexing symbols based on a known spur frequency and a known carrier frequency.

31. The receiver of claim 27, wherein the auxiliary circuit is configured to estimate one or more spur phase parameters by estimating a spur phase change rate over Orthogonal Frequency Division Multiplexing symbols based on the output of an inverse transformer when there is no transmitted signal in present.

32. The receiver of claim 27, wherein the auxiliary circuit is configured to estimate a spur amplitude by computing an power for the identified bin and determining a spur amplitude based on the computed power.

33. The receiver of claim 27, wherein the auxiliary circuit is configured to determine a phase detection metric by determining multiple possible spur initial phases and computing a phase detection metric for each possible initial phase of the multiple possible spur initial phases.

34. The receiver of claim 27, wherein the auxiliary circuit is configured to determine a phase detection metric by determining a phase detection metric for each phase of a plurality of predetermined phases to produce a plurality of phase detection metrics and estimating a spur phase based on the plurality of phase detection metrics.

35. The receiver of claim 34, wherein the auxiliary circuit is configured to determine a phase detection metric by comparing each phase detection metric of the plurality of phase detection metrics to other phase detection metrics of the plurality of phase detection metrics to produce a plurality of comparisons and estimating a spur phase based on the plurality of comparisons.

36. The receiver of claim 27, wherein the auxiliary circuit is configured to cancel a spur in an output signal of the plurality of parallel output signals by determining a reconstructed spur based on the estimated one or more spur phase parameters and the estimated spur amplitude and subtracting the reconstructed spur from the output signal.

37. The receiver of claim 27, wherein the auxiliary circuit is configured to cancel a spur in an output signal of the plurality of parallel output signals by determining a negative of a spur based on the estimated one or more spur phase parameters and the estimated spur amplitude and subtracting the negative of a spur from the output signal.

38. The receiver of claim 27 further comprising one or more memory devices coupled to the auxiliary circuit, wherein the one or more spur phase parameters comprise a spur initial phase, and wherein the auxiliary circuit is further configured to determine a running average of the estimated spur initial phase and amplitude when a transmitted signal is present and store the averaged spur initial phase and amplitude in the one or more memory devices.

39. The receiver of claim 27, further comprising one or more memory devices coupled to the auxiliary circuit, wherein the auxiliary circuit is configured to estimate one or more spur phase parameters and a spur amplitude without a transmitted signal present and to store the estimated one or more spur phase parameters and a spur amplitude in the one or more memory devices.

* * * * *